(12) United States Patent
Mohan et al.

(10) Patent No.: US 8,648,646 B2
(45) Date of Patent: Feb. 11, 2014

(54) SYSTEM AND METHOD FOR GENERATING ABRITRARY VOLTAGE WAVEFORMS

(76) Inventors: Anand Mohan, Bangalore (IN); Sumeet Mathur, Bangalore (IN)

(*) Notice: Subject to any disclaimer, the term of this patent is extended or adjusted under 35 U.S.C. 154(b) by 0 days.

(21) Appl. No.: 13/301,778

(22) Filed: Nov. 22, 2011

(65) Prior Publication Data

US 2013/0127522 A1    May 23, 2013

(51) Int. Cl.
*G05F 1/10*    (2006.01)

(52) U.S. Cl.
USPC ............................................. 327/536; 327/157

(58) Field of Classification Search
USPC .................................. 327/157, 530, 534–536
See application file for complete search history.

(56) References Cited

U.S. PATENT DOCUMENTS

2006/0250177 A1* 11/2006 Thorp et al. .................. 327/536

* cited by examiner

*Primary Examiner* — Lincoln Donovan
*Assistant Examiner* — Diana J Cheng
(74) *Attorney, Agent, or Firm* — Law Office of Heena N. Kampani; Heena N. Kampani

(57) ABSTRACT

An electrical system for generating arbitrary voltage waveform includes a power supply unit for providing a supply voltage to the electrical system. One or more charge pumps are in electrical communication with the power supply unit. Each charge pump generates a voltage. The electrical system also includes a plurality of switches, a first switch among the plurality of switches coupled between a ground and an output terminal, other switches among the plurality of switches coupled between the one or more charge pumps and the output terminal. A control circuit is in electrical communication with the power supply unit, the plurality of switches and the one or more charge pumps, and is operable to control the voltage generated by the each charge pump and the plurality of switches. Voltages from the one or more charge pumps additively result in a variable output voltage that generates an arbitrary voltage waveform.

9 Claims, 5 Drawing Sheets

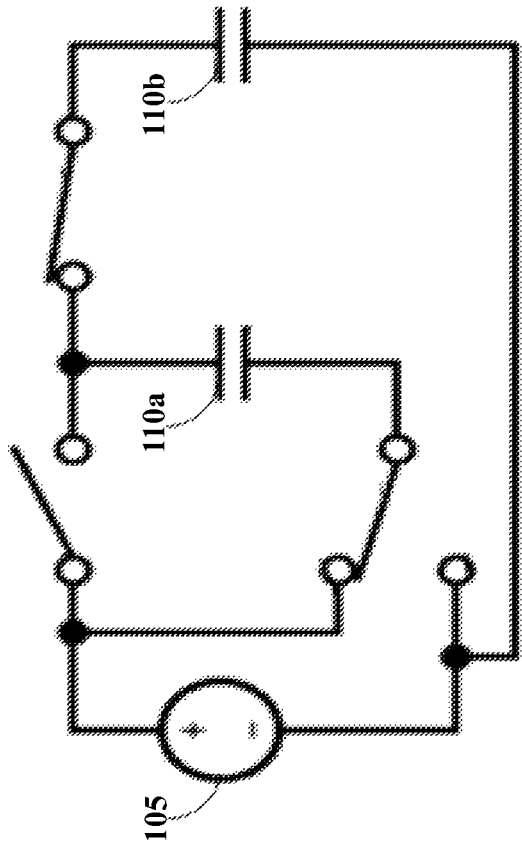
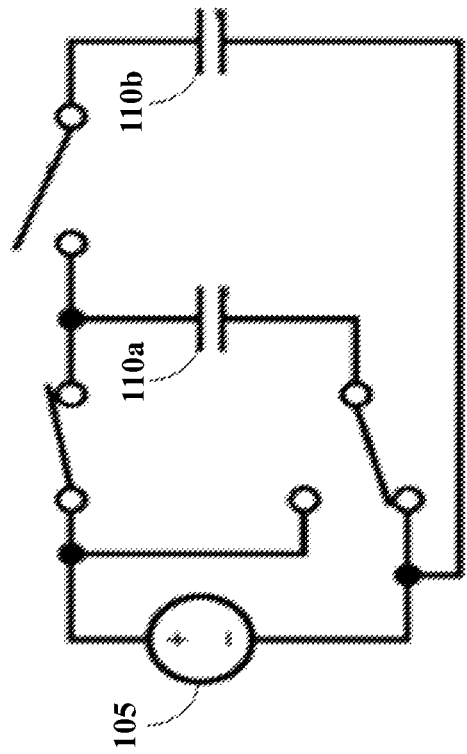
FIG. 1 (Prior-Art)

US 8,648,646 B2

SYSTEM AND METHOD FOR GENERATING ABRITRARY VOLTAGE WAVEFORMS

TECHNICAL FIELD

Embodiments of present disclosure described herein provide a system and method for generating arbitrary output voltage waveforms using a charge pump.

BACKGROUND

In recent years, technological developments in electronics industry have given rise to electronic products requiring various voltages that are inherently different from a single supply voltage delivered from a power supply. The various voltages required by the electronic products vary from being a constant voltage supply to one that varies with time. Furthermore, existing conventional voltage generation units within the electronic products are often energy inefficient with heavy charge losses. For example, FIG. 1A-1B (Prior-Art) is an exemplary illustration of a charge pump circuit 100 along with a load. A power supply 105 is used to charge a capacitor 110a as shown in FIG. 1A. For high voltage generation, the voltage is scaled by coupling the capacitor 110a in series to a capacitor 110b. The high voltage is then provided to a load across the capacitors. In one embodiment, the high voltage generated by the charge pump circuit 100 is converted to a square wave on a load 205 by means of a switch 210 as shown in FIG. 2. During discharge process, the charge on the load is dumped to a ground. Thus necessitating for the capacitor to be charged from zero to the high voltage during the next charging process.

There is a need to generate arbitrary voltage waveforms efficiently from a single supply voltage with electrical components that are present within the electronic products without requiring additional battery or any other power supply. Moreover, there is a need for a control mechanism for controlling the generation of various voltages that can be used to power the sub systems within the electronic products.

SUMMARY

An example of an electrical system for generating a variable output voltage includes a power supply unit for providing a supply voltage to the electrical system. One or more charge pumps are in electrical communication with the power supply unit. Each charge pump generates a voltage. The electrical system also includes a plurality of switches, a first switch among the plurality of switches coupled between a ground and an output terminal, other switches among the plurality of switches coupled between the one or more charge pumps and the output terminal. A control circuit is in electrical communication with the power supply unit, the plurality of switches and the one or more charge pumps, the control circuit operable to control the voltage generated by the each charge pump and the plurality of switches, voltages from the one or more charge pumps additively result in the variable output voltage. An arbitrary voltage waveform is generated based on the variable output voltage.

An example of a method for generating a variable output voltage includes receiving a signal, indicative of generation of the variable output voltage. One or more charge pumps are selectively configured to generate a plurality of voltages. Further, a plurality of switches are selectively configured to output the plurality of voltages from the one or more charge pumps sequentially, thereby resulting in the generation of the variable output voltage. An arbitrary voltage waveform is generated based on the variable output voltage.

BRIEF DESCRIPTION OF THE FIGURES

In the accompanying figures, similar reference numerals may refer to identical or functionally similar elements. These reference numerals are used in the detailed description to illustrate various embodiments and to explain various aspects and advantages of the present disclosure.

FIG. 1A-1B is an exemplary charge pump circuit, in accordance with a prior-art;

DETAILED DESCRIPTION OF THE EMBODIMENTS

Various embodiments discussed in this disclosure pertain to generation of arbitrary voltage waveforms. In existing voltage generation circuits, charging and discharging of output voltage result in loss of energy. This energy loss increases exponentially with increase in the output voltage. The present disclosure addresses the aforementioned problem.

Figure 2:
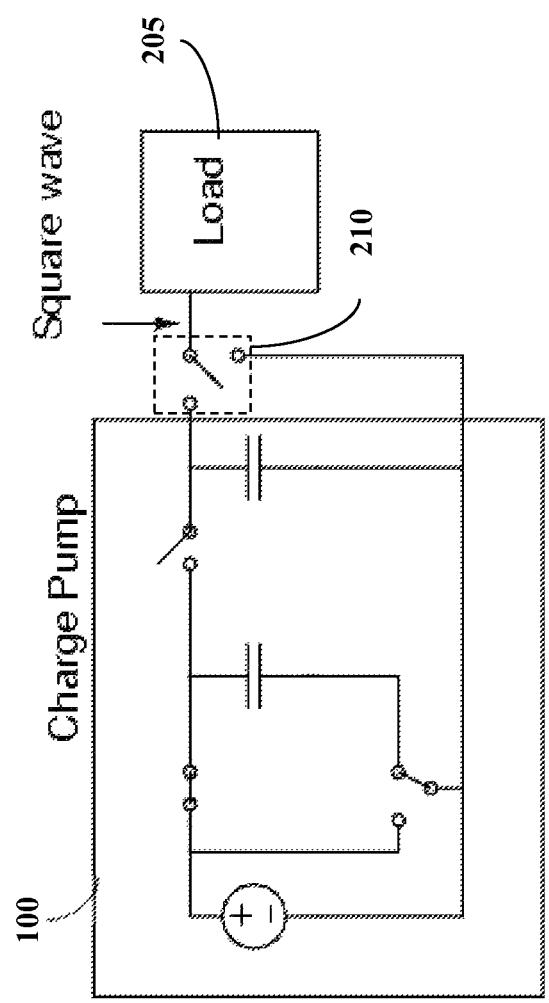
FIG. 2 is an exemplary charge pump circuit for generating a square wave, in accordance with a prior-art.
Figure 3:
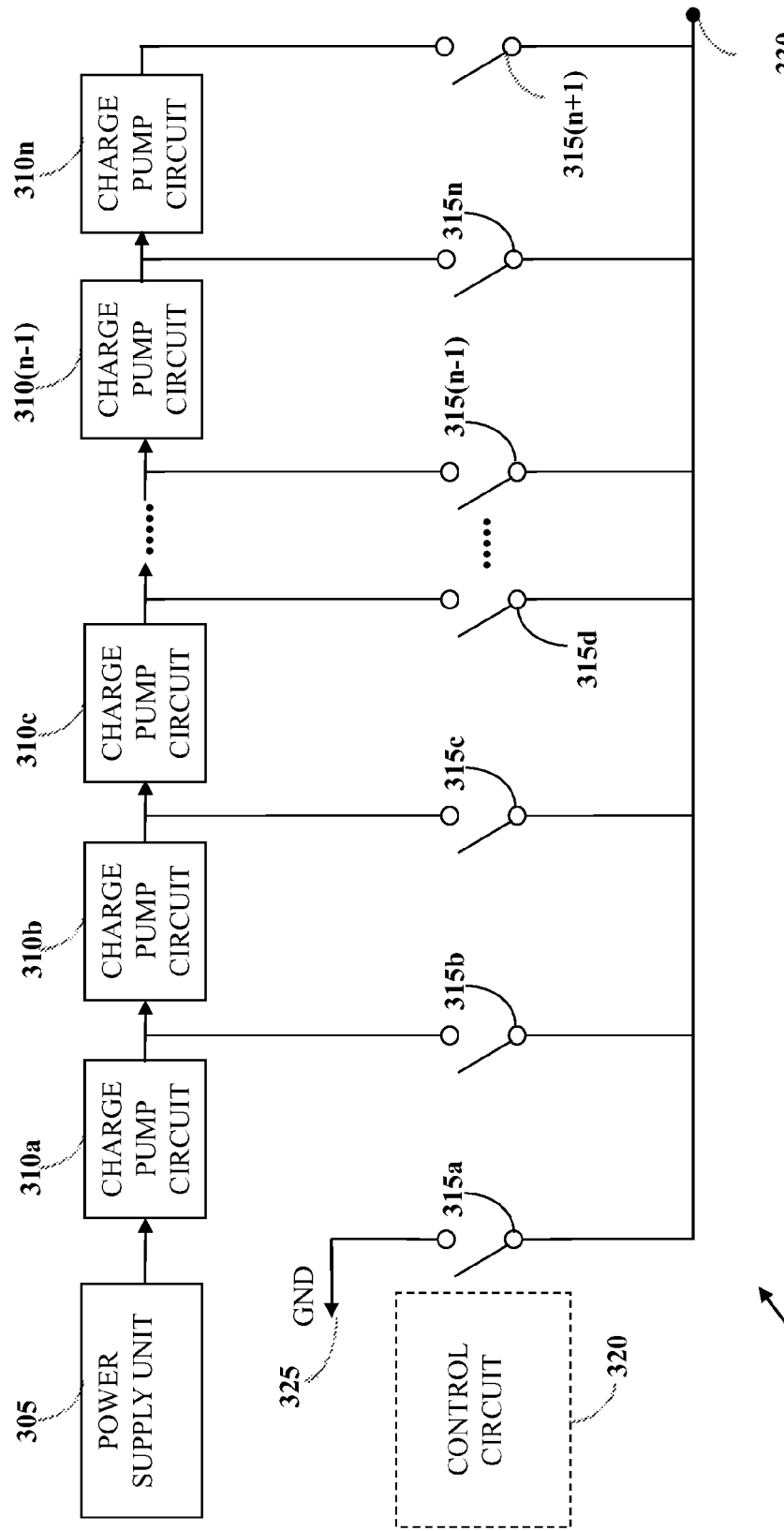
FIG. 3 illustrates an electrical system for generating variable output voltage, in accordance with an embodiment.

FIG. 3 is a block diagram of an electrical system 300 for generating variable output voltage, in accordance with which various embodiments are implemented.

The electrical system 300 includes a power supply unit 305. The power supply unit 305 provides a supply voltage to the electrical system 300. The electrical system 300 also includes one or more charge pump circuits, for example a charge pump 310a, a charge pump 310b and so on. In the FIG. 3, there are n charge pumps, wherein n is an integer. Further, the one or more charge pump circuits are in electrical communication with the power supply unit 305. Each pump can generate a voltage.

Further, the electrical system includes a plurality of switches, for example a switch 315a, a switch 315b and so on. In the FIG. 3, there are n+1 charge pumps, wherein n is an integer. The switch 315a is coupled between a ground (GND) 325 and an output terminal (OP) 330. Other switches among the plurality of switches are coupled between charge pumps and the output terminal 330. For example, the switch 315b is coupled between the charge pump 310a and the OP 330, the switch 315c is coupled between the charge pump 310b and the OP 330, and so on. The nth charge pump 315n is coupled between charge pump 310(n+1) and the OP 330. The plurality of switches is used for coupling output terminals of the one or more charge pump circuits to the OP 330 or the GND 325. Further, the plurality of switches can be in two possible states that are the switches can be either in connected state or in disconnected state. The plurality of switches conducts in the connected state and do not conduct in the disconnected state.

Further, the electrical system includes a control circuit 320. The control circuit 320 is in electrical communication with the power supply 305, the plurality of switches and the one or more charge pumps. The control circuit 320 is operable to control the plurality of switches, so that voltages from the one or more charge pumps additively result in the variable output voltage required. In an embodiment, the variable output voltage is used to generate required output voltage waveforms.

In an embodiment, the n charge pumps are cascaded in series. For example, the output terminal of the charge pump 310a is coupled to an input terminal of the charge pump 310b, the output terminal of the charge pump 310b is coupled to the input terminal of the charge pump 310c, and so on. The output terminal of the charge pump 310n is coupled to the switch 315(n+1). In one embodiment, the one or more charge pump circuits include one or more electrical components. The electrical components are energy storage elements, for example, capacitors. The energy storage elements are charged to, for example, the voltage provided by the power supply unit 305. In some embodiments, the one or more charge pump circuits disclosed herein can be extended to any electrical circuit comprising electrical components like inductors, and capable of generating signals.

Examples of the output voltage waveforms include, but are not limited to, a square wave voltage, a sine wave voltage or any arbitrary wave voltage of predefined voltage and frequency. The square wave voltage can be obtained by means of a switch coupled to the OP 330, a peak voltage of the square wave corresponding to a required variable output voltage with the switch turned on. Any arbitrary wave voltage of predefined voltage and frequency can be generated by configuring the plurality of switches to output a desired voltage and frequency. In an embodiment, the output voltage, for example a square wave voltage is approximated with a trapezoidal waveform with the highest voltage a multiple of the voltage provided by the power supply unit 305. Here, the voltages on the trapezoidal ramps are provided by the various charge pump output voltages.

In one embodiment, the variable output voltage is used to drive a load coupled to the output terminal 330. The load can be an electrical circuit or device.

The GND 325 provides an electrical ground to the electrical system 300.

In an embodiment, the electrical circuit 300 generates a high output voltage V at the output terminal 330. The control circuit 320 configures n charge pumps to generate the high output voltage V. The power supply unit 305 provides a supply voltage to charge the energy storage elements in the n charge pumps. Charge pump, k, generates a voltage kV/n. The output voltage V is obtained by connecting the output terminals of the charge pumps to the output terminal 330 sequentially using the plurality of switches. The control circuit 320 manages the operation of switches to generate the output voltage V gradually. For example, the switch 315a is in a disconnected state. The switch 315b is closed by the control circuit 320 to output voltage V/n from the charge pump 310a. Next, the switch 315b is closed by the control circuit 320 to output V/n from the charge pump 310a resulting in 2V/n at the output terminal 330. Similarly, the switches corresponding to the other charge pumps are closed to output voltage V at the output terminal 330.

To discharge the output voltage from the peak output voltage V, the output terminal 330 is disconnected from n charge pumps sequentially by the control circuit 320 by disconnecting the load at the output terminal 330 and corresponding switches. This results in the charge corresponding to the voltage V/n to be supplied back to the energy storage elements of each charge pumps. Hence, peak output voltage V is reduced to the voltage V/n which can then be discharged to the GND 325. The loss of energy during the discharge phase is thus reduced significantly. Further, the amount of energy required for regenerating the high voltage is reduced since the charge required for regeneration is held by the energy storage elements of each charge pump (except charge pump 310a). As a result, the time required for regeneration of the output voltage is also significantly reduced.

The electrical system 300 also provides for generating signals of different shapes and peak voltage without the need of any additional circuitry. The shape of the output signal can be controlled by the control circuit 320 by timing the voltages output from the charge pumps. The peak voltage of the output signal can also be varied by controlling the voltage output by the one or more charge pumps.

In some embodiments, few of the charge pumps among the n charge pumps can be used to generate the output voltage. This enables access to an array of intermediate voltages from zero to the high voltage V (0, V1, V2, . . . , Vn−1, Vn), where (0, V1, V2, . . . , Vn−1, Vn) are voltages generated by the charge pumps. When it is required to ramp the output to Vn from zero, the output terminal 330 is shorted to the intermediate voltages (V1, V2, . . . , Vn−1) one after the other through the plurality of switches before shorting it to Vn. This scheme of ramping the output voltage via a number of intermediate voltages available from the cascade of the charge pumps reduces the amount of energy lost in driving (charging) the load (capacitor C1) at the output terminal 330. While charging the output to a voltage higher than the present voltage or while discharging the output to a voltage lower than the present voltage, if the output is made to traverse through all the intermediate taps, energy loss of the system is minimized.

In one example, the energy loss is thus reduced for a capacitor (C1) coupled to the output terminal 330 from $C1*Vn*Vn$ to $C1*Vn*Vn/n$ where n is the number of charge pumps and C1 is capacitance value of the capacitor across the output terminal 330. The voltage drawn from the last charge pump is a fraction of the high output voltage Vn. Thus the amount of energy required to recharge the charge pump to Vn also reduces. Any arbitrary output waveform required can be generated by quantizing the waveform to the intermediate voltages (0, V1, . . . , Vn) and by means of the control circuit 320.

Figure 4:
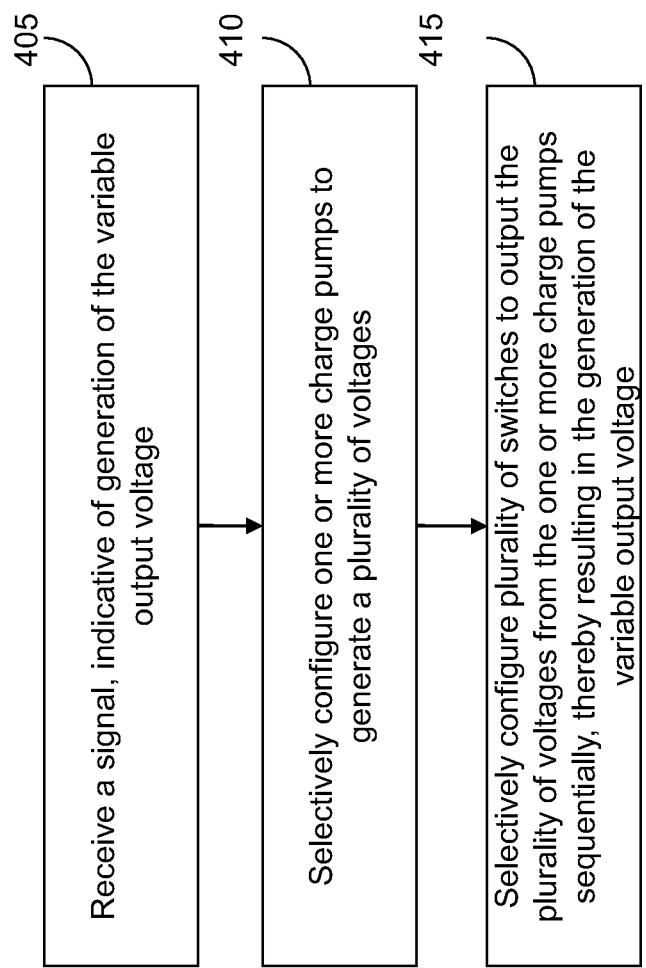
FIG. 4 is a flow chart illustrating a method of generating variable output voltage, in accordance with an embodiment.

FIG. 4 is a flow chart illustrating a method of generating a variable output voltage, in accordance with an embodiment.

The electrical system 300 is used for generating variable output voltage. The variable output voltage to be generated can be based on the load at the output terminal. In some embodiments, the electrical system 300 is operable to detect the load.

At step 405, a signal, indicative of generation of the variable output voltage is received. The signal is received by the electrical system 300. A power supply unit provides a supply voltage to the one or more charge pumps. Each charge pump includes an energy storage element to store charges. For example, a capacitor.

At step 410, the one or more charge pumps are selectively configured to generate a plurality of voltages.

The one or more charge pumps generate the plurality of voltages by charging internal energy storage elements using the supply voltage of the electrical system 300. The selective configuring of the one or more charge pumps to generate the plurality of voltages is performed using the control circuit 320 of FIG. 3. For example, the control circuit 320 can define the voltage to be generated by each charge pump.

At step 415, plurality of switches is selectively configured to output the plurality of voltages from the one or more charge pumps sequentially. The selective configuring of the one or more charge pumps is performed using a control circuit, for example the control circuit 320 of FIG. 3. The sequential output of the plurality of voltages results in the generation of the variable output voltage. The variable output voltage is used for generating arbitrary voltage waveform by configuring the one or more charge pumps and the plurality of switches to generate a desired output voltage. Further, the control circuit 320 can selectively configure the plurality of switches to recharge the one or more charge pumps with the plurality of voltages sequentially during discharge of the variable output voltage.

Figure 5:
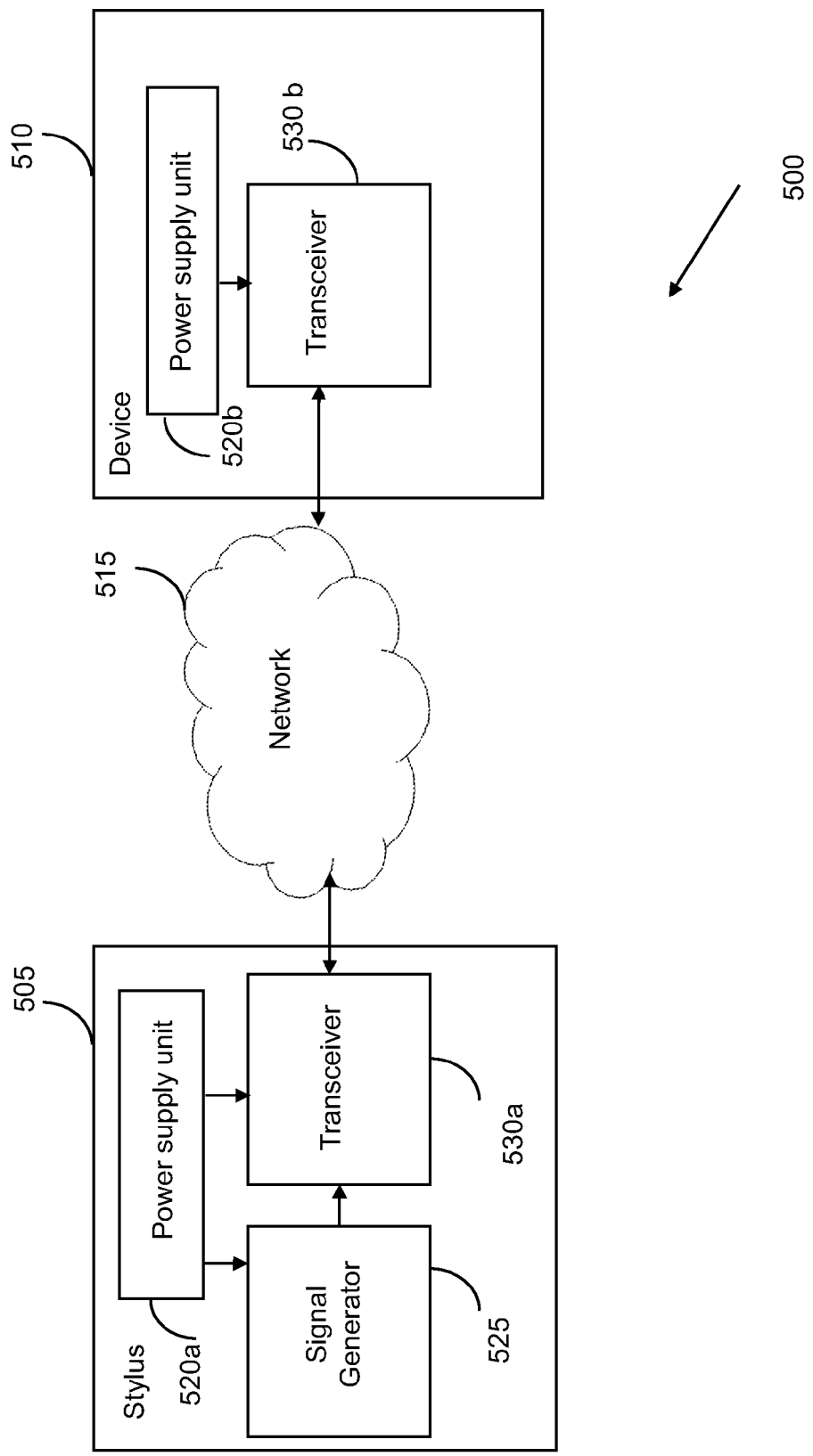
FIG. 5 is a block diagram of an environment, in accordance with one embodiment.

FIG. 5 is a block diagram of an environment 500, in accordance with one embodiment.

The environment 500 includes a stylus 505 in electronic communication with a device 510. Examples of the device include, but are not limited to, a computer, a laptop, a mobile device, a handheld device, a personal digital assistant (PDA). In one embodiment, the stylus 505 in electronic communication with a device 510 through a network 515. Examples of the network 515 include, but are not limited to, a telecommunication network, a radio network, a local area network (LAN) and a wide area network (WAN).

The stylus 505 includes a power supply unit 520a, a signal generator 525, and a transceiver 530a. The device 510 includes a power supply unit 520b and a transceiver 530b.

The signal generator 525 is based on the electrical system 300 of FIG. 3. The signal generator 525 is connected to the transceiver 530a, and the power supply 520a which supplies power to an energy storage element based signal generator 525 and the transceiver 530a. The power supply 520b supplies power to the transceiver 530b. A signal generated by the signal generator 525 is transmitted by the transceiver 530a through the network 515. The signal is received by the transceiver 530b and processed by the device 510. In an embodiment, the signal can be a high voltage pulse.

An application area of the signal generator 525 includes, but is not limited to a near field communication. Other examples of the application areas include microelectromechanical (MEM) systems, radio frequency (RF) MEM systems, etc. For example, a high voltage pulse generated by the signal generator 525 can be used to bias MEMS elements on an integrated chip.

In the foregoing discussion, the term "coupled" refers to either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

We claim:

1. An electrical system for generating a variable output voltage, the electrical system comprising:
a power supply unit for providing a supply voltage to the electrical system;
one or more charge pumps in electrical communication with the power supply unit, wherein each charge pump generates a voltage;
a plurality of switches, a first switch among the plurality of switches coupled between a ground and an output terminal, other switches among the plurality of switches coupled between the one or more charge pumps and the output terminal; and
a control circuit in electrical communication with the power supply unit, the plurality of switches and the one or more charge pumps, the control circuit operable to control the voltage generated by the each charge pump and the plurality of switches, voltages from the one or more charge pumps additively result in the variable output voltage.

2. The electrical system as in claim 1, wherein the one or more charge pumps are connected in series.

3. The electrical system as in claim 2, wherein an output terminal of the one or more charge pumps is connected to one of a switch and a succeeding charge pump.

4. The electrical system as in claim 1, wherein the one or more charge pumps comprises one or more energy storage elements.

5. The electrical system as in claim 4, wherein the one or more energy storage elements are charged to a corresponding voltage using the power supply unit.

6. The electrical system as in claim 1, wherein the output terminal is coupled to a load.

7. The electrical system as in claim 1, wherein the variable output voltage is one of a square wave voltage, a sine wave voltage and an arbitrary wave voltage of predefined voltage and frequency.

8. The electrical system as in claim 1, wherein the variable output voltage is a multiple of the constant voltage provided by the power supply.

9. The electrical system as in claim 1, wherein the electrical system is a subsystem of an integrated circuit chip.

* * * * *